US005724644A

United States Patent [19]

Wassink et al.

[11] Patent Number: 5,724,644

[45] Date of Patent: Mar. 3, 1998

[54] METHOD OF AND RECEIVER FOR PROCESSING AND REPRODUCING A MESSAGE

[75] Inventors: Derk J. C. Wassink; Heinz W. Wetsels; Frans A. Westra, all of Eindhoven, Netherlands

[73] Assignee: U.S. Philips Corporation, New York, N.Y.

[21] Appl. No.: 574,827

[22] Filed: Dec. 19, 1995

[30] Foreign Application Priority Data

Dec. 20, 1994 [EP] European Pat. Off. ............ 942036914

[51] Int. Cl.[6] ............................................ H04B 1/16

[52] U.S. Cl. ..................... 455/38.4; 455/186.1; 455/345; 340/905

[58] Field of Search .................................. 455/45, 156.1, 455/38.4, 185.1, 186.1, 345; 340/905; 364/437

[56] References Cited

U.S. PATENT DOCUMENTS 5,173,691 12/1992 Sumner .................................. 340/905

FOREIGN PATENT DOCUMENTS

2515965B2 10/1977 Germany .
4237987A1 5/1994 Germany .

*Primary Examiner*—Chi H. Pham
*Attorney, Agent, or Firm*—Edward W. Goodman

[57] ABSTRACT

A method of processing and reproducing a coded message, which message is divided into a first and a second part, the first part including information which briefly characterizes the message. The first part is reproduced acoustically and the second part is reproduced visually. By acoustically reproducing only a part of the message, a user is distracted only briefly and need not listen to the entire message if this message is not relevant to the user. If the message is relevant to the user, the user can consult the display for the rest of the message.

9 Claims, 3 Drawing Sheets

2/3

METHOD OF AND RECEIVER FOR PROCESSING AND REPRODUCING A MESSAGE

BACKGROUND OF THE INVENTION

1. Field of the Invention

The invention relates to a method comprising the steps of receiving, processing and reproducing a message, this message has been transmitted in a code which is independent of the reproducing method.

The invention also relates to a receiver for receiving a message in a code which is independent of the method of reproduction and the processing thereof, the which receiver comprising:

a data bank, acoustic reproducing means, visual reproducing means, an input for receiving data from the data bank, which data relates to the message, control means adapted to:

read data at the input in response to codes included in the message, which codes refer to data stored in the data bank, drive the acoustic reproducing means and the visual reproducing means so as to reproduce the received message on the basis of the data read from the data bank.

DESCRIPTION OF THE RELATED ART

Such a method and receiver are known from the Rhine Corridor Project, supervised by the Dutch Department of Public Works. This project uses a receiver employing a method of processing and reproducing coded messages. These messages comprise, inter alia, traffic messages, which are transmitted in the RDS information conveyed with the program signal. These so-called Traffic Message Channel traffic messages comprise an event description and a location name, which location name includes at least a generic location designation (for example, a highway number) and a specific location designation (for example, the name of a traffic junction or a place name). The entire traffic message is acoustically reproduced by the receiver and the location name is also reproduced on the display.

The acoustic reproduction of the entire message has the disadvantage that if the message is not relevant to a user who receives this message in a vehicle, the user has to hear out the whole message although the user is not interested in it. It is true that the user can disable the TMC announcements but in that case the user runs the risk of missing out on TMC messages which are relevant to the user.

SUMMARY OF THE INVENTION

It is the object of the invention to provide a method of and a receiver for processing and reproducing a message such that the user's accessibility to the information is maintained without the user being wearied unduly with information which is not relevant to the user.

To this end, the method in accordance with the invention is characterized by:

the division of the message into a first part and a second part in such a manner that the first part comprises a primary designation, which is characteristic of the message, and the second part comprises a secondary designation, the at least acoustic reproduction of the first part and the optional visual reproduction of the second part.

To this end, a receiver in accordance with the invention is characterized in that the control means are adapted to divide the message into a first part and a second part in such a manner that the first part comprises a primary designation, which is characteristic of the message, and the second part comprises a secondary designation, and the control means are further adapted to reproduce at least the first part by the acoustic reproducing means and at option the second part by means of the visual reproducing means. The invention utilizes the fact that the user only wishes to receive a complete message if the message is relevant to him and that acoustic reproduction of a message is less liable to distract the user's attention from the traffic than visual reproduction. An acoustic reproduction of the gist of a message will draw the user's attention to information that may be relevant to him. If the information appears to be relevant the user may decide to request further information, which can be reproduced visually. As a result of this, the message reproduction keeps its impact without turning into a routine and the user keeps the possibility of being informed of the entire message. An additional advantage of the invention is that not all the information has to be reproduced both acoustically and visually, so that not all the information has to be stored both in visual form (in the form of text) and in acoustic form (for example, in the form of audio samples), which leads to a reduction of the storage capacity.

A variant of the method in accordance with the invention is characterized in that visual reproduction is effected only in response to a command from a user. This has the advantage that the display for the visual reproduction does not change continually upon reception of a traffic message. Displaying traffic messages upon receipt would result in a constantly changing display, which could unnecessarily distract the driver's attention.

A variant of the method in accordance with the invention, in which the message includes a location name and a traffic direction, is characterized in that processing includes the allocation of the location name to the first part comprising the primary designation, and the traffic direction to the second part comprising the secondary designation. When the step in accordance with the invention is used, the location name, which comprises for example an exit number, is reproduced acoustically and the traffic direction is reproduced visually. Of this information, particularly the location name is of significance to the user as a message selection criterion and, if desired, the user can read the traffic direction on the display if the location name is relevant to him. Since the reproduction of the location name generally requires a shorter time than the reproduction of the traffic direction (which often requires two location names) the user's attention is now drawn again for a short time only.

A further variant of the method in accordance with the invention, in which the traffic direction is indicated by means of a starting location and an end location, is characterized in that the visual reproduction of the second part comprises the successive reproduction of the starting location and the end location with a distinctly perceivable mutual difference.

The sequence of the starting location and the end location indicates the direction to which the message relates. By first reproducing the starting location and subsequently the end location of the specific location name with a distinctly perceivable mutual difference the user can see to which direction the messages relates. This is a particularly suitable reproduction method if use is made of a display with a small number of characters and with insufficient room for the reproduction of two locations at the same time.

A variant of the method in accordance with the invention, in which the message includes a location name comprising a generic and a specific location designation, is characterized in that processing includes the allocation of the generic location designation to the first part, and the specific location designation to the second part. Here, use is made of the recognition that for message selection by the user, the generic location designation (for example, a highway number or a highway segment) is adequate and that the specific location designation is only of interest to the user if the general location designation is relevant to him.

A further variant of the method in accordance with the invention, in which the specific location designation includes a starting location and an end location, is characterized in that the visual reproduction of the second part comprises the successive reproduction of the starting location and the end location with a distinctly perceivable mutual difference.

If a message has a specific location designation including a starting location and an end location, the sequence of these two locations is indicative of a direction affected by the event. By first reproducing the starting location and subsequently the end location of the specific location name with a distinctly perceivable mutual difference, the user can simply deduce the direction to which the message relates. This is a particularly suitable reproduction method if a display is used with a small number of characters and with insufficient room for the reproduction of two locations at the same time.

A variant of the method in accordance with the invention, in which the message includes an event description, is characterized in that processing includes the allocation of the event description to the first part.

An event description may also be a criterion by means of which a user decides whether or not he requires more information. The event description "slow traffic" need not occasion a user to choose another route, whereas an event description "tailback" may be a reason to change his route.

A variant of the method in accordance with the invention, in which the event description includes a cause and an effect, is characterized in that processing includes the allocation of the effect to the first part.

An effect included in the event description may directly affect a user, whereas an associated cause generally provides background information to explain the effect. By acoustically reproducing only information which may directly affect the user, this is more likely to draw the user's attention. Moreover, the user's attention is required for a shorter time when the directly relevant part and the less relevant part of the event description are not both reproduced acoustically.

BRIEF DESCRIPTION OF THE DRAWINGS

The invention will now be described in more detail with reference to the accompanying drawings. In the drawings.

In these Figures like elements bear the same reference symbols.

DESCRIPTION OF THE PREFERRED EMBODIMENTS

The embodiment described herein is a receiver for processing and reproducing traffic messages transmitted in coded form in the Radio Data System with a program signal which is FM modulated on a carrier wave. In the Radio Data System, group 8A has been reserved for the transmission of traffic messages. This group 8A is referred to as the Traffic Message Channel. Coded traffic messages, comprising an event description and a location name, can be conveyed in this group. The event description describes what is going on, for example, congestion caused by an accident, and the location name describes where this has happened. The protocol for TMC messages is the Alert-C protocol, described in the Alert-C Traffic Message Coding Protocol, Proposed Pre-Standard, November 1990, which specifies the composition of TMC messages.

Figure 1:
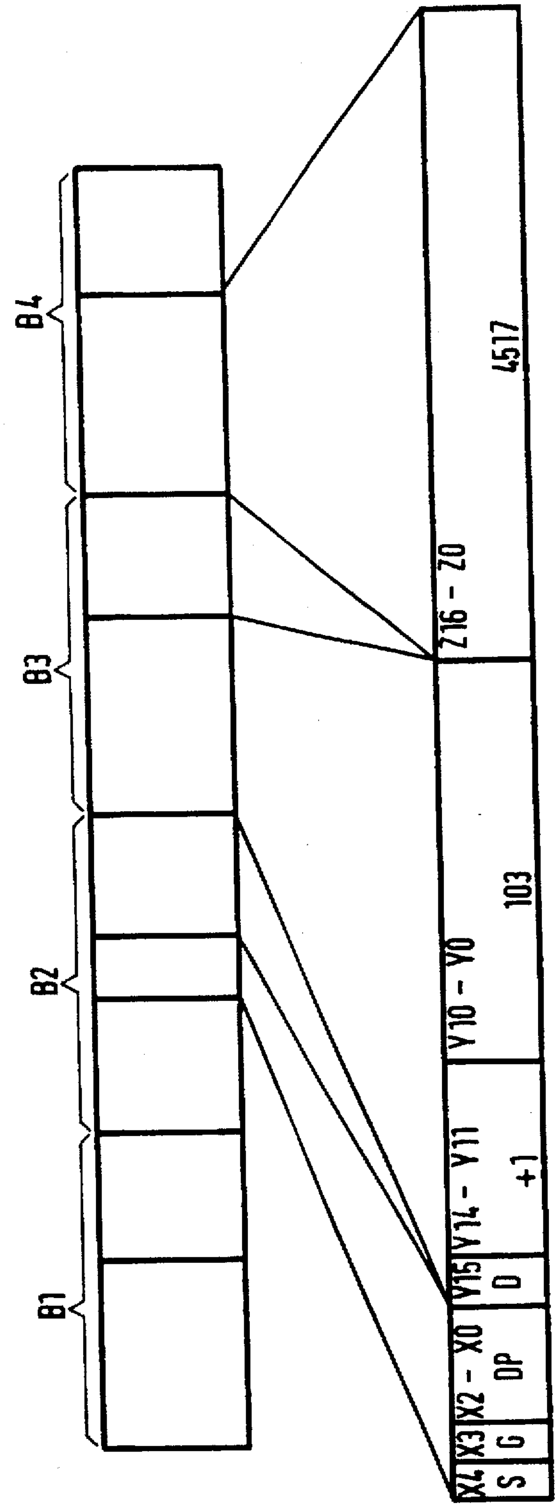
FIG. 1 is a diagram of an example of an RDS TMC message.

FIG. 1 shows a diagram of a TMC message. The shown message in group 8A comprises 4 blocks B1, B2, B3 and B4, the actual traffic message being included in the last 5 bits of the second block B2 and the bits in the third and the fourth block B3, B4. The bits X4 . . . X0 provide information about the type of message. The bits Y10 . . . Y0 contain an Event code, indicating the traffic event and referring to one or more texts describing the event. The bits Z15 . . . Z0 carry a Location code, and the bits Y14 . . . Y11 contain an Extent code. The Location and Extent codes include the location name, which name refers to one or more location designations, for example place names. The above-mentioned Protocol specifies these references.

In the example of Figure, the Event code is 217 and refers to the text:

"Stationary traffic for 2 km caused by accident"

The Location code is 4517 and refers to the exit of highway A12 near Veenendaal. The Extent code +1 refers to a second location, which is one position down in the list, i.e., the exit of highway A12 near Ede/Wageningen. From the sign (+) of the Extent code and, consequently, the sequence of the first and the second location, it follows that the event occurs in the direction from Ede/Wageningen to Veenendaal. The Protocol specifies that the information to which the Location code refers also includes a highway segment of the highway A12, on which the location name is situated. The relevant highway segment of highway A12, in the present case between Arnhem and Utrecht, is defined by means of two location designations, i.e., "Arnhem" and "Utrecht". The full traffic message now reads:

"A12, Arnhem direction Utrecht, between exit Ede/Wageningen and Veenendaal, stationary traffic for 2 km caused by an accident."

The location name may be regarded as comprising a generic location designation ("A12") and a specific location designation, including a starting location ("Ede/Wageningen") and an end location ("Veenendaal"). The location name further includes a reference to a highway segment. This segment is specified by means of a highway segment starting location ("Arnhem") and a highway segment end location ("Utrecht"). The traffic direction can be derived from the sign of the Extent information. The event description may be regarded as comprising a cause and an effect. "Stationary traffic for 2 km caused by an accident" may therefore be divided into a cause "accident" and an effect "stationary traffic for 2 km". The above information is adequate for a correct understanding of the invention. For more information about the Alert-C protocol, reference is made to the above-mentioned Protocol.

Figure 2:
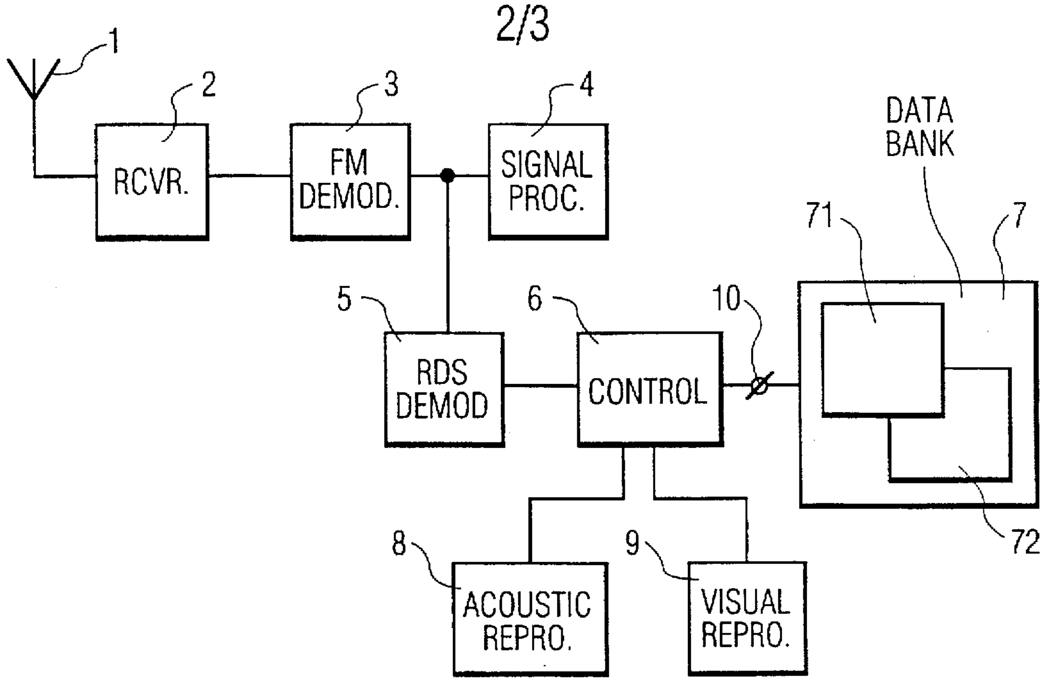
FIG. 2 is a diagram of a receiver in accordance with the invention.

FIG. 2 shows a receiver in accordance with the invention. In addition to an aerial 1, a receiving section 2, an FM demodulation section 3, an RDS demodulation section 5 and a signal-processing section 4, the present receiver, which is configured to process and reproduce coded traffic messages in accordance with the Radio Data System, comprises for this purpose:

- acoustic reproducing means 8,
- visual reproducing means 9,
- an input 10 for receiving data from a data bank relating to event descriptions and location names,
- control means adapted to:
  - read data at the input 10 in response to codes included in the message, these codes enabling reference to be made to data stored in the data bank 7,
  - drive the acoustic reproducing means 8 and the visual reproducing means 9 so as to reproduce the received message on the basis of the data read from the data bank 7.

In FIG. 2, the data bank 7 has been divided into a first data bank 71 and a second data bank 72. This division is, of course, not necessary for the invention but serves to clarify the difference between the stored data. The first data bank 71 stores a list of event descriptions, for which the cause per event code is stored in the form of text for visual reproduction and the result is stored in the form of audio samples and, if desired, in the form of text for visual reproduction (although the latter is not necessary). It follows that the effect is classified as a primary description and the cause as a secondary description. The second data bank 72 stores information about the location names belonging to a Location code. For each Location code and Event code, information is stored divided into a primary description, which can be reproduced acoustically, and a secondary description, which can be reproduced visually. For each Location code, at least the following information is stored:

- a highway number, this number being the generic location designation and relates to the highway on which the first location designation is situated, this highway number being stored in the form of audio samples (and, if desired, also in the form of text),
- a name of the location designation, this name being herein referred to as "location", stored in the form of text which can be reproduced on a display,
- a reference to a storage location of a highway segment, on which highway segment the first location designation is situated,
- a Location code of a preceding location designation,
- a Location code of a subsequent location designation.

From the foregoing, it follows that the highway number is assigned to the primary designation (because it can be reproduced acoustically) and the name of the location designation is assigned to the secondary designation. The two last-mentioned Location codes refer to preceding and following location designations and are used to find a second designation by means of the Extent code. The Location codes are thus included in a list having a kind of pointer structure with references to the preceding and following Location codes. The Extent code indicates how many references have to be stepped through to find the second location designation in the list. Further information about this can be found in the above-mentioned Protocol.

The storage location of the highway segment contains the highway number and the names of a first highway-segment location and a second highway-segment location, which names are stored in the form of text. These highway-segment locations serve to define the relevant highway segment. Again, the highway number is assigned to the primary designation and the (names of the) first and the second highway-segment location to the secondary designation.

The invention uses the system to divide a received message into a first part and a second part, depending on the relevance, the first part of greater relevance being reproduced acoustically. The above division of both the information belonging to a Location code and the information belonging to an Event code into a part comprising a primary and a secondary designation, is based on the relevance of the information. For example, the effect "stationary traffic for 2 km" is more relevant to a user than "caused by an accident". The same applies to the other examples: the highway number "A12" is more relevant than "Ede/Wageningen" and "Utrecht", not only because the user generally knows on which highway he drives but does not know exactly where, but also because "A12" is much shorter than "Ede/Wageningen" or "Utrecht".

Figure 4:
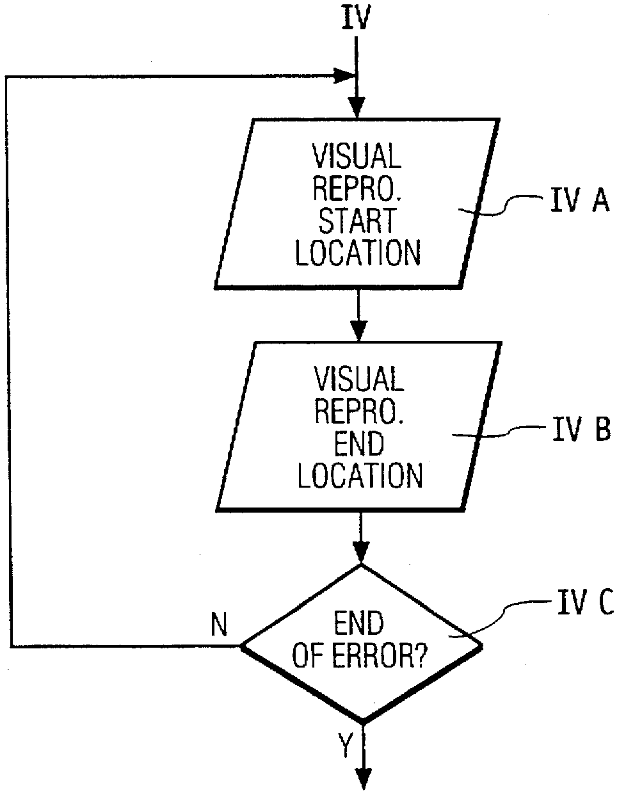
FIG. 4 is a diagrammatic flowchart of the reproduction of 2 location names in a receiver in accordance with the invention.
Figure 3:
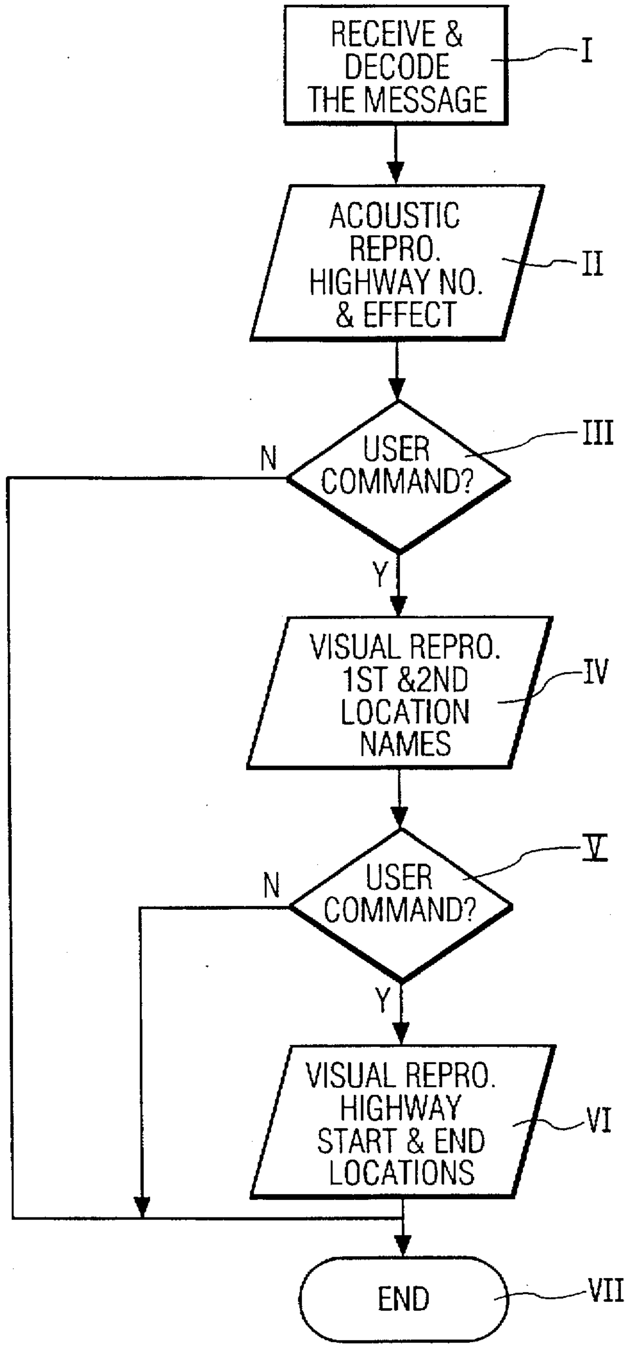
FIG. 3 is a diagrammatic flowchart of the processing of an RDS TMC message in the receiver in accordance with the invention.

The operation of the receiver in accordance with the invention will now be explained with the aid of a received message as represented in FIG. 1 and the flow charts shown in FIGS. 3 and 4. Table 1 gives the functions of the blocks in FIGS. 3 and 4.

TABLE 1

| Block no. | Description |
|---|---|
| I | Reception + decoding of TMC message |
| II | Acoustic reproduction of highway number and effect |
| III | User command? |
| IV | Visual reproduction of first and second location names |
| IVA | Visual reproduction of starting location |
| IVB | Visual reproduction of end location |
| IVC | End of reproduction? |
| V | User command? |
| VI | Visual reproduction of highway segment starting location and highway-segment end location |
| VII | End |

A carrier wave, which has been frequency-modulated with an information signal is received by means of the aerial 1 and the receiving section 2, after which the information signal is obtained at the output of the FM demodulator 3. A program signal contained in the information signal is further processed by the signal processing section 4. The RDS demodulator 5 demodulates an RDS signal included in the information signal. In the control means 6, the coded traffic message (as shown in FIG. 1) present in the RDS signal is processed so as to form a code for the event description, i.e. the Event code, and two codes for the location designation, i.e., the Extent code and the Location code. This is effected in block I of the flowchart of FIG. 3. The codes refer to storage locations in the data bank 7, which in the present case comprises a first data bank 71 and a second data bank 72.

In block II a part of the message is reproduced acoustically, i.e. the highway number and the effect in the event description. This is effected as follows. By means of the Location code "4517", the control means 6 reads out the storage location in the data bank 71, where the highway number corresponding to this Location code is stored. This highway number is the generic location designation. Subsequently, the contents of this storage location is applied to the acoustic reproducing means 8 for acoustic reproduction of the highway number, in the present case "A12". After this, the effect corresponding to the Location code is read out of the data bank 71 with the aid of the Event code, in the present case "103", and is applied to the acoustic reproducing means 8 for acoustic reproduction of the effect, in the present case, "stationary traffic for 2 km". Thus, after reception of the message, the user hears the following text: "A12, stationary traffic for 2 km". This short acoustic reproduction will draw the attention of the user only briefly. Briefly summarized, in block II, the information corresponding to the Location code and the Event code assigned to the primary designation is successively read out by the control means 6 and reproduced by the acoustic reproducing means 8.

If the user wishes to have more information, for example, when the user drives on the A12, he can give a command to the receiver, for example by pressing an appropriate key on the receiver or, if the receiver is equipped for this, by speaking the command. This is effected in block III of FIG. 3. In block IV, upon receipt of the user command, the starting location and the end location of the specific location designation are reproduced visually. First of all, in block IVA, the starting location is displayed, for example, in green, and subsequently, in block IVB, if desired after a given waiting time, the end location is displayed, for example, in red. As a result of this difference in reproduction, the user will clearly see which is the starting location and which is the end location. From this information the user can infer the direction of traffic to which the messages relates. The successive reproduction of the starting location and the end location is terminated when a given criterion is met in block IVC. This criterion may be: the exiration given period of time, a user command for which reason the blocks IVC and V may, in fact, be regarded as a combination) etc. Briefly summarized, in block IV, the information corresponding to the Location code and the next Location code defined by the Extent code relative to the Location code, which have been assigned to the secondary designation, is read out by the control means 6 and reproduced by the visual reproducing means 9. In more detail, reproduction in accordance with block IV proceeds as follows. The control means 6 reads out the location name stored under the location code and applies this data to the visual reproducing means 9, in the present case, a displays. The visual reproducing means 9 now display this location name, in the present case, "Ede/Wageningen", in, for example, a green color. Subsequently, the control means 6 reads out the Location code of the next location, this code being stored with the current Location code. Since the Extent code is "+1", the Location code thus found is the Location code which corresponds to an end location. If the sign is negative, the Location code will be the end location and the combination of the Location code with the Extent code will indicate the starting location. Subsequently, the control means 6 reads out the location name corresponding to the new Location code (which name is stored at the storage location corresponding to the new Location code), in the present case, "Veenendaal", and applies this data to the visual reproducing means 9, which now displays the new location name in another color, for example, in red. The visual reproducing means 9 now alternately displays "Ede/Wageningen" in green and "Veenendaal" in red, for example, until a given period of time has elapsed or a new traffic message is received, or the user gives a command. This choice is at the discretion of the designer of the receiver. The alternate reproduction of the two location names can be controlled by the control means 6, namely, in that the control means alternately reads out the location name corresponding to the old Location code and transfers it to the visual reproducing means 9, and subsequently do the same for the location name corresponding to the new Location code. However, this choice as well as the reproduction method of the location names are of no further relevance to the invention. An essential feature is that the user can simply distinguish between the first location name, i.e., the starting location, and the second location name, i.e., the end location, so that the user knows the direction of traffic to which the messages relates.

It may occur that the user does not know exactly where these locations are situated, so that he does not know the direction of traffic. To allow for this situation, the control means 6 may be configured in such a manner that after a user command, successively the location names are displayed which define the highway segment to which the message relates. This is effected in block VI. After a user command (block V), the control means 6 reads out the reference to the storage location of the highway segment. The first and second highway segment locations ("Arnhem" and "Utrecht", respectively), also referred to as highway-segment starting location and highway-segment end location, are now read out successively to indicate the direction of traffic with their sequence, and are transferred to the visual reproducing means 9, where they are displayed in the same way as the first and the second location name. Thus, the starting location and the end location of the highway segment are displayed in a manner which readily allows the user to infer the direction of traffic to which the message relates. Since the location names used for defining highway segments are generally comparatively big towns or cities, most users will know how these towns or cities are situated relative to one another and will be able to infer the direction of traffic from the sequence of these location names. The visual reproduction as described above specifically relates to reproduction by means of a display which has only a comparatively small number of characters. In some cases it may be necessary to abbreviate "Ede/Wageningen" to a length suitable for the display.

It is obvious that if the display does not have a limited reproduction capability, the entire message can be displayed in a manner known from the cited prior art. The brief acoustic reproduction is then maintained, however, in order not to distract the user's attention unnecessarily if the message does not relate to his situation.

The invention is not limited to the present embodiment.

If desired, the block III may be omitted if it is desirable that the starting and end locations are also reproduced immediately after the acoustic reproduction. For a simplified embodiment which does not utilize highway segments, blocks V and VI may be omitted. Furthermore, it will be obvious to an expert that the control means can be implemented in various manners. However, this is not essential for the invention. Essential for the invention is the division of the message into a first part, which has a signalling function and is therefore acoustically reproduced, and a second part, which contains more detailed information, which is visually reproduced. If desired, the first part may be reproduced both acoustically and visually. In the example shown, this division is not determined by the transmitted code but by the manner in which the information corresponding to this code is classified and stored. Therefore, this division can be determined by the manufacturer of the receiver. The present division into a primary designation and a secondary designation is therefore merely an example of such a division.

The data bank 7 may be permanently incorporated in the receiver but may alternatively be an external data bank mounted in the receiver. For this purpose the data bank is constructed, for example, as a plug-in card or a plug-in module. Moreover, it is possible to make the first data bank 71 internal and the second data bank 72 external or vice versa.

If the desired, the event description stored in the data bank 71 may be reduced to the effect only (the cause being omitted), which has the advantage that the storage capacity required for the first data bank 71 can be reduced, so that this data bank can be cheaper. The event descriptions "Stationary traffic for 2 km as a result of roadwork" and "Stationary traffic for 2 km caused by accident" are then both stored as "Stationary traffic for 2 km".

Moreover, it is obvious to store the messages automatically in an additional memory to reproduce them upon a command from the user. If the display allows this, it is also possible to reproduce the entire message visually on the display, the first part of the message, which is characteristic of the message, still being reproduced acoustically.

The invention is not limited to the RDS system. It is possible to transmit messages via other systems and process them in accordance with the invention. An example of this is Digital Audio Broadcasting, which also includes a feature for the transmission of messages parallel to the program signal. The invention is not limited to traffic messages but can also be applied to fields of use in which other messages are transmitted. An example of this can be found in the field of paging. Pagers may be configured in accordance with the invention to receive and process a coded message comprising an information item which characterizes the message and thus serves to draw attention. This information item indicates, for example, that an appointment or a meeting is concerned. A display then gives details about the place and/time of the appointment/meeting, etc. It is to be noted, however, that the above-mentioned examples are merely intended as non-limitative examples.

We claim:

1. A receiver for receiving a message in a code which is independent of the method of reproduction and the processing thereof, said receiver comprising:

input means for receiving said message;

demodulating means for demodulating said message;

a data bank;

acoustic reproducing means;

visual reproducing means;

control means having a first input coupled to receive said demodulated message, and input/output means coupled to the data bank supplying codes contained in said message to said data bank and for receiving data from said data bank relating to the codes in the message, said control unit further including means coupled to said acoustic reproducing means and said visual producing means for reproducing the message on the basis of data read from the data bank, characterized in that the control means comprises means for dividing the message into a first part and a second part in such a manner that the first part comprises a primary designation, which is characteristic of the message, and the second part comprises a secondary designation, and the control means further comprises means for reproducing at least the first part by the acoustic reproducing means and, selectively, the second part by the visual reproducing means.

2. A receiver as claimed in claim 1, characterized in that the control means effects said visual reproduction only in response to a command from a user.

3. A receiver as claimed in claim 1, in which the message includes codes relating to a location name and a traffic direction stored in said data bank, characterized in that the control means reproduces the location name by at least the acoustic reproducing means and reproduces the traffic direction by the visual reproducing means.

4. A receiver as claimed in claim 3, characterized in that the visual reproducing means comprises means for reproducing the traffic direction by a successive reproduction of a starting location and an end location with a distinctly perceivable mutual difference.

5. A receiver as claimed in claim 1, in which the message includes codes representing a location name comprising a generic and a specific location designation stored in said memory, characterized in that the control means divides the location name into a generic and a specific location designation, and reproduces the generic location designation at least by the acoustic reproducing means and reproduces the specific location designation by the visual reproducing means.

6. A receiver as claimed in claim 5, characterized in that the specific location designation includes a starting location and an end location, and the control means causes the visual reproducing means to reproduce the starting location and the end location with a distinctly perceivable mutual difference.

7. A receiver as claimed in claim 1, in which the message further includes codes representing an event description stored in said data bank, characterized in that the control means reproduces the event description by at least the acoustic reproducing means.

8. A receiver as claimed in claim 1, in which the message further includes codes representing an event description stored in said data bank, said event description including a cause and an effect, characterized in that the control means reproduces only the effect of the event description by the acoustic reproducing means.

9. A receiver as claimed in claim 1, characterized in that the receiver comprises in succession a receiving section, an FM demodulating section and a signal-processing section, as well as an RDS demodulator coupled between an output of the FM demodulating section and an input of the control means.

* * * * *